(12) United States Patent
Tokuda et al.

(10) Patent No.: US 6,520,041 B2
(45) Date of Patent: Feb. 18, 2003

(54) THREE PARALLEL SHAFT TYPE AUTOMATIC TRANSMISSION

(75) Inventors: Moriaki Tokuda, Saitama (JP); Takashi Hotta, Saitama (JP); Fumihiro Yoshino, Saitama (JP); Shuji Ueda, Saitama (JP); Tetsu Kanou, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/942,562

(22) Filed: Aug. 31, 2001

(65) Prior Publication Data

US 2002/0026840 A1 Mar. 7, 2002

(30) Foreign Application Priority Data

Sep. 6, 2000 (JP) .......................... 2000-270319

(51) Int. Cl.$^7$ ................................. F16H 3/08
(52) U.S. Cl. ............... 74/359; 74/333; 74/373; 74/375
(58) Field of Search ............... 74/331, 333, 336 R, 74/355, 356, 359, 361, 373, 374, 375, 377

(56) References Cited

U.S. PATENT DOCUMENTS

| 5,081,878 A | * | 1/1992 | Stasiuk ........................ 74/331 |
| 5,704,247 A | * | 1/1998 | Ahluwalia et al. ............ 74/331 |
| 5,887,483 A | * | 3/1999 | Ohashi et al. ............ 74/336 R |
| 5,906,132 A | * | 5/1999 | Janiszewski ................. 74/331 |

FOREIGN PATENT DOCUMENTS

| EP | 833080 | * | 4/1998 | |
| GB | 2067250 | * | 7/1981 | ................. 74/359 |
| JP | 402129439 | * | 5/1990 | ................. 74/359 |
| JP | 10-103463 | | 4/1998 | |

\* cited by examiner

*Primary Examiner*—Charles A Marmor
*Assistant Examiner*—Ha Ho
(74) *Attorney, Agent, or Firm*—Armstrong, Westerman & Hattori, LLP

(57) ABSTRACT

A driven gear G3$b$ for a forward second gear G3 which is obtained by a hydraulic clutch C3 on a second input shaft 5 is disposed contiguous with a driven gear G4$b$ for a first gear G4. A spacer collar 9 is provided on an output shaft 6 so as to be positioned between a selector hub 8$a$ and the driven gear G3$b$ for the second gear G3, and the driven gear G4$b$ for the first gear G4 is rotatably supported on the spacer collar 9.

5 Claims, 3 Drawing Sheets

THREE PARALLEL SHAFT TYPE AUTOMATIC TRANSMISSION

BACKGROUND OF THE INVENTION

1. Field of the Invention

The present invention relates to a three parallel shaft type automatic transmission in which a first input shaft, a second input shaft adapted to rotate in synchronism with the first input shaft and an output shaft are disposed in parallel with one another.

2. Description of the Related Art

In general, a parallel shaft type automatic transmission includes two shafts, an output shaft and an input shaft, which are disposed in parallel with each other and a plurality of speed gears provided in series between the input shaft and the output shaft via hydraulic clutches provided individually for the speed gears, respectively. With this parallel shaft type automatic transmission, however, if the number of speed gears is increased, the axial length of the transmission is increased. To cope with this, there is also conventionally known a three parallel shaft type automatic transmission in which a first input shaft, a second input shaft adapted to rotate in synchronism with the first input shaft and an output shaft are disposed in parallel with one another, and in which a plurality of speed gears are provided in series between the first and second input shafts and the output shaft, respectively.

In addition, the size of the transmission has to be increased if a hydraulic clutch is provided exclusively for the reverse gear. Therefore, with a view to sharing the hydraulic clutches (the first hydraulic clutch) for obtaining any of the forward gears (the first gear) disposed on the first input shaft for use for the reverse gear, there is known an automatic transmission disclosed in JP-A-10-103463. Specifically, a reverse drive gear is integrally connected to a first speed drive gear which is connected to the first input shaft via a first hydraulic clutch and is rotatably supported on a first input shaft. In an output shaft, a first speed driven gear for mesh engagement with the first speed drive gear and a reverse driven gear which meshes with the reverse drive gear via an idle gear are positioned at axial ends of a selector hub connected to an output shaft, and are rotatably supported on the output shaft. And, both the driven gears are made free to be selectively connected to the selector hub via a forward and reverse switching selector. When the first hydraulic clutch is engaged in a state in which the first speed driven gear is connected to the selector hub, a first gear is obtained. On the other hand, when the first hydraulic clutch is engaged in a state in which the reverse driven gear is connected to the selector hub, a reverse gear is obtained.

Additionally, in the automatic transmission constructed as described above, a forward second gear is disposed between the second input shaft and the output shaft so as to be obtained by the engagement of the second hydraulic clutch disposed on the second input shaft on the same side as the first hydraulic clutch with respect to the axial direction. A second speed driven gear is connected to the output shaft while being kept contiguous with the reverse driven gear.

In the conventional automatic transmission, the reason why the second speed driven gear is disposed contiguous with the reverse driven gear is to reduce the axial length of the transmission as much as possible. In this particular conventional automatic transmission, however, when the first gear is obtained, the reverse driven gear rotates in a reverse direction relative to the second speed driven gear which rotates in the normal direction together with the output shaft due to power transmission from the first hydraulic clutch. This is to generate friction between the second speed driven gear and the reverse driven gear while the vehicle is running in the first gear, this resulting in increase in friction loss.

SUMMARY OF THE INVENTION

The present invention was made in view of the aforesaid problem and an object thereof is to provide a three parallel shaft type automatic transmission which can make its axial length as short as possible and reduce the friction loss.

With a view to attaining the object, according to the invention, there is provided a three parallel shaft type automatic transmission, including a first input shaft, a second input shaft adapted to rotate in synchronism with the first input shaft and an output shaft which are disposed in parallel with one another. A first hydraulic clutch for obtaining a forward first gear and a second hydraulic clutch for obtaining a forward second gear are separately provided on the first input shaft and the second input shaft, respectively. A drive gear for the first gear connected to the first input shaft via the first hydraulic clutch and a reverse drive gear integrally connected to the first gear drive gear are rotatably supported on the first input shaft. A driven gear for the first gear for mesh engagement with the first gear drive gear and a reverse driven gear adapted to mesh with the reverse drive gear via an idle gear are positioned on axial ends of a selector hub connected to the output shaft to be rotatably supported on the output shaft, both the first gear driven gear and reverse driven gear being made free to be selectively connected to the selector hub via a forward and reverse switching selector. A drive gear for the second gear connected to the second input shaft via the second hydraulic clutch is rotatably supported on the second input shaft, whereas a driven gear for the second gear adapted to mesh with the second gear drive gear is connected to the output shaft. The second gear driven gear is disposed contiguously with the first gear driven gear, a spacer collar is disposed on the output shaft so as to be positioned between the selector hub and the second gear driven gear, and the first gear driven gear is rotatably supported on the spacer collar.

According to the invention, there is generated no friction between the second gear driven gear and the reverse driven gear when the first gear is obtained. On the other hand, when the reverse gear is obtained, the first gear driven gear rotates in the normal direction through transmission of power thereto from the first hydraulic clutch relative to the second gear driven gear which rotates in the reverse direction together with the output shaft, thereby producing the possibility that there is caused friction between the first gear driven gear and the second gear driven gear. According to the invention, however, the press contact of the second gear driven gear against the first gear driven gear is avoided by means of the spacer collar, and therefore friction loss that would be caused by friction generated between both the driven gears does not become so large. In addition, even if there is generated a slight amount of friction, there is extremely low in probability that the reverse gear is obtained, and therefore there is no risk of the fuel economy being deteriorated by the friction between the two driven gears.

Incidentally, the drive gear and driven gear for each speed gear have helical teeth. Then, in the event that the orientation of helical teeth formed in the first gear driven gear is set so as to generate a thrust force in a direction in which the driven gear approaches the selector hub when the first gear driven gear rotates in the normal direction which is a forward rotating direction of the driven gear, when the reverse gear is obtained, the first gear driven gear is pressed by the thrust force in a direction in which the first gear driven gear is separated away from the second gear driven gear, no friction being generated thereby between the two driven gears.

On the other hand, since the first gear driven gear is pressed against the selector hub by the thrust force, there is caused friction between the first gear driven gear and the selector hub. However, since slide contact surfaces of the two members have oil grooves originally formed for supplying lubricating oil to the selector and are sufficiently lubricated, friction loss, if any, between the first gear driven gear and the selector hub becomes extremely small. In addition, in the event that the orientation of the helical teeth formed in the first gear driven gear is set so as to generate a thrust forth in a direction in which the first gear driven gear is separated apart from the selector hub when the same driven gear rotates in the clockwise direction, since there is caused friction between the first gear driven gear and the second gear driven gear when the reverse gear is obtained, there needs to form oil grooves in the second gear driven gear for lubricating the slide contact surface thereof which confronts the first gear driven gear. Then, since the formation of the oil grooves reduces the effective length of a connecting portion of the second gear driven gear relative to the output shaft by the depth of the oil grooves, the overall length of the connecting portion has to be increased with a view to ensuring an effective length required for maintaining a predetermined strength, this calling a problem that the axial length of the transmission is increased. To cope with this, in the event the orientation of the helical teeth formed in the first gear driven gear is set so as to generate the thrust force in the direction in which the first gear driven gear approaches the selector hub when the first gear driven gear rotates in the normal direction as described above, there needs to form no oil grooves for lubricating oil in the second gear driven gear, the aforesaid drawback is not generated.

Note that in an embodiment which will be described below the aforesaid first gear denotes a 4th speed G4, and the second gear a third speed G3.

DETAILED DESCRIPTION OF THE PREFERRED EMBODIMENTS

Figure 1:
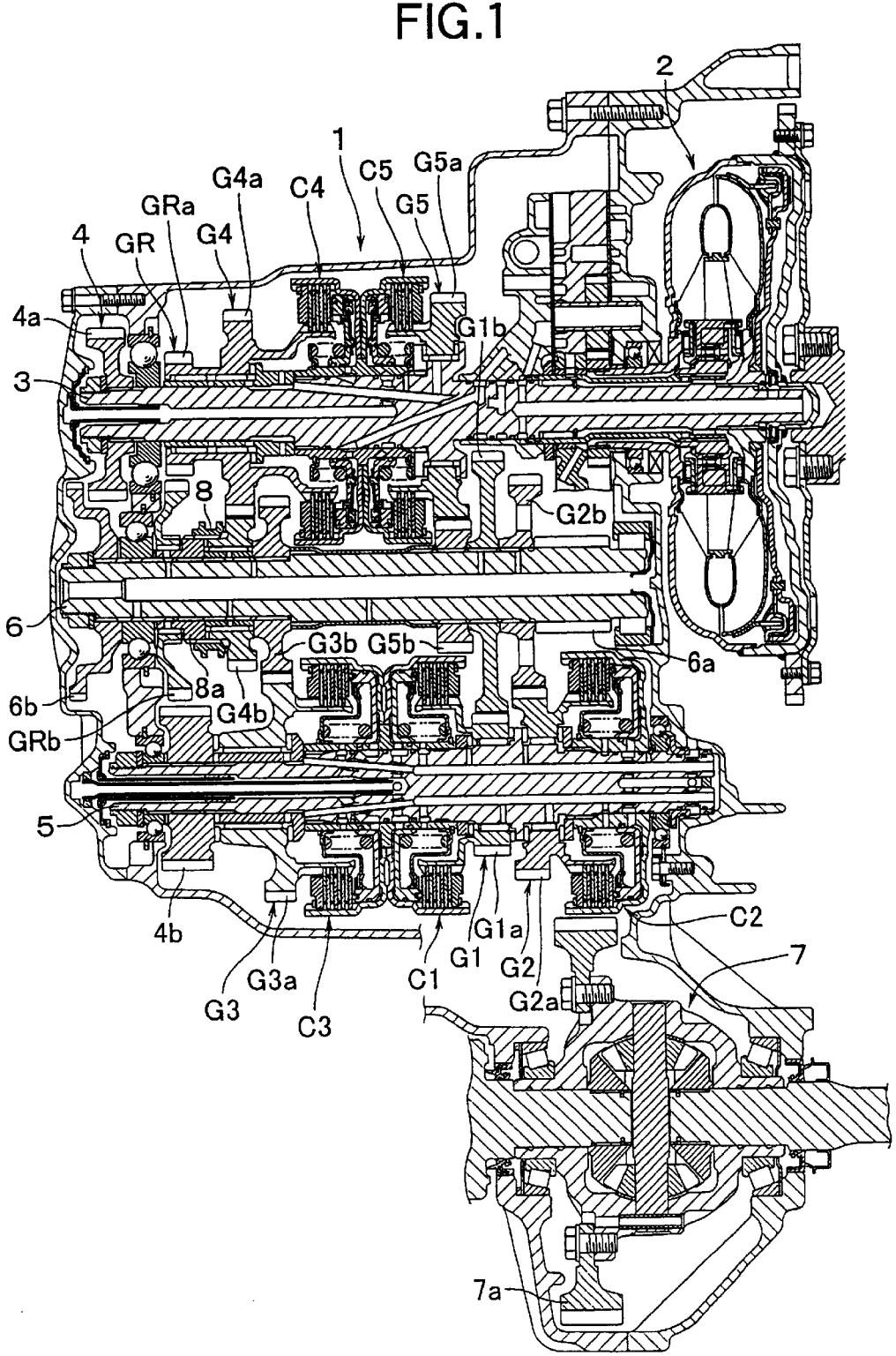
FIG. 1 is a development view of one embodiment of an automatic transmission according to the invention.
Figure 2:
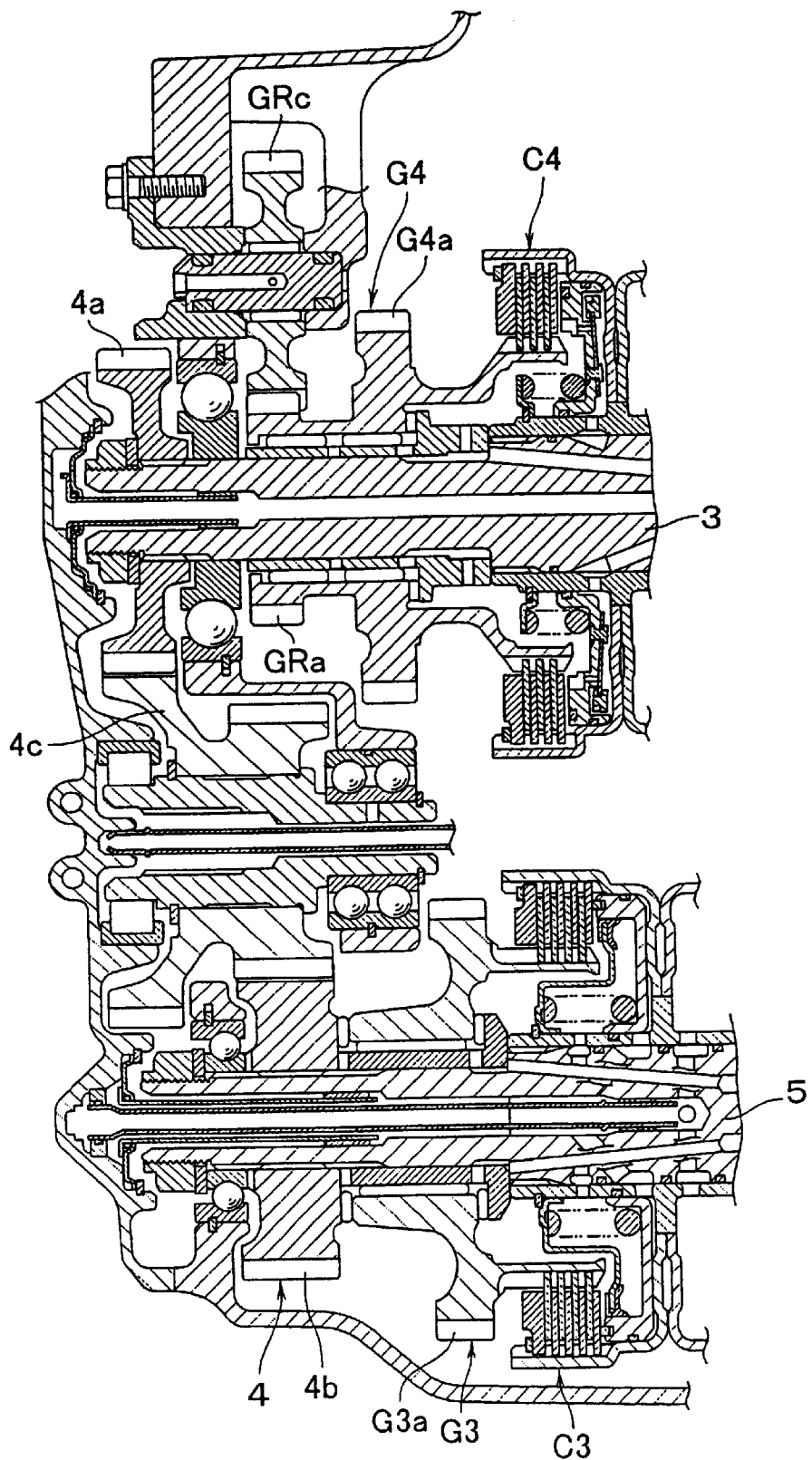
FIG. 2 is a development cross-sectional view showing a gear train portion for connecting both first and second input shafts of the automatic transmission shown in FIG. 1.

Referring to FIG. 1, reference numeral 1 denotes a vehicle automatic transmission for carrying out speed changing of five forward gears and a reverse gear. The transmission 1 is structured by a three parallel shaft type automatic transmission having a first input shaft 3, a second input shaft 5 and an output shaft 6 are disposed in parallel with one another. The first input shaft 3 is connected to an engine (not shown) via a hydraulic torque converter 2. The second input shaft 5 is connected to the first input shaft 3 via a gear train 4 (refer to FIG. 2) in such a manner as to rotate in synchronism with the first input shaft 3. The output shaft 6 has an output gear 6a provided at an end thereof for mesh engagement with a final gear 7a on a differential gear 7 adapted to be connected to driving wheels of the vehicle. Note that while the final gear 7a and the output gear 6a are illustrated as being spaced away from each other in FIG. 1, this is due to the fact that FIG. 1 is a development view, and in reality the two gears 6a, 7a are in mesh with each other. In addition, the gear train 4 includes a gear 4a at an end of the first input shaft 3, a gear 4b at an end of the second input shaft 5 and an idler 4c adapted to mesh with both the gears 4a, 4b. In the figure, reference numeral 6b denotes a parking gear connected to an axially outside end portion of the output shaft 6.

Provided in series between the first input shaft 3 and the output shaft 6 are a 5th speed G5, a 4th speed G4 and a reverse gear GR. Further, a Second speed G2, a Low speed G1 and a third speed G3 are provided in series between the second input shaft 5 and the output shaft 6. To describe this construction in greater detail, a fifth speed hydraulic clutch C5 and a fourth speed hydraulic clutch C4 are disposed back to back at an intermediate portion of the first input shaft 3 in such a manner that the former is oriented toward an axially inside direction, while the latter is oriented toward an axially outside direction. A fifth speed drive gear G5a connected to the first input shaft 3 via the fifth speed hydraulic clutch C5 is rotatably supported on the first input shaft 3, and a fifth speed driven gear G5b which meshes with the fifth speed drive gear G5a is splined to the output shaft 6, so that the 5th speed G5 is obtained when the fifth speed hydraulic clutch C5 is engaged.

In addition, a fourth speed drive gear G4a connected to the first input shaft 3 via the fourth speed hydraulic clutch C4 and are verse drive gear GRa integrally connected to the fourth speed drive gear G4a are rotatably supported on the first input shaft 3. Further, a fourth speed driven gear G4b which meshes with the fourth speed drive gear G4a and a reverse driven gear GRb which meshes with the reverse drive gear GRa via an idle gear GRc (refer to FIG. 2) are positioned at axial ends of a selector hub 8a splineconnected to the output shaft 6 to be rotatably supported on the output shaft 6. Thus, the fourth speed driven gear G4b and the reverse driven gear GRb can be free to be selectively connected to the selector hub 8a via a forward and reverse switching selector 8. Then, in the forward range, the fourth speed driven gear G4b is connected to the selector hub 8a by the selector 8 so that the 4th speed G4 is obtained when the fourth speed hydraulic clutch C4 is engaged, while in the reverse range, the reverse gear GR is obtained by bringing the fourth speed hydraulic clutch C4 into engagement in a state in which the reverse driven gear G4b is connected to the selector hub 8a by the selector 8.

A second speed hydraulic clutch C2 is disposed at an axially inside end of the second input shaft 5 in such a manner as to be oriented toward an axially outside direction. A second speed drive gear G2a connected to the second input shaft 5 via the second speed hydraulic clutch C2 is rotatably supported on the second input shaft 5, and a second speed driven gear G2b which meshes with the second speed drive gear G2a is spline-connected to the output shaft 6, so that a Second speed G2 is obtained when the second speed hydraulic clutch C2 is engaged. Furthermore, a first speed hydraulic clutch C1 and a third speed hydraulic clutch C3 are disposed back to back at an intermediate portion of the second input shaft 5 in such a manner that the former C1 is oriented toward an axially inside direction, while the latter is oriented toward an axially outside direction. A first speed drive gear G1a connected to the second input shaft 5 via the first speed hydraulic clutch C1 is rotatably supported on the second input shaft 5, and a first speed driven gear G1b which meshes with the first speed drive gear G1a is spline-connected to the output shaft 6, so that a Low speed G1 is obtained when the first speed hydraulic clutch C1 is engaged. In addition, a third speed drive gear G3a connected to the second input shaft 5 via the third speed hydraulic clutch C3 is rotatably supported on the second input shaft 5, and a third speed driven gear G3b which meshes with the third speed drive gear G3a is spline-connected to the output shaft 6, so that a third speed G3 is obtained when the third speed hydraulic clutch C3 is engaged.

Figure 3:
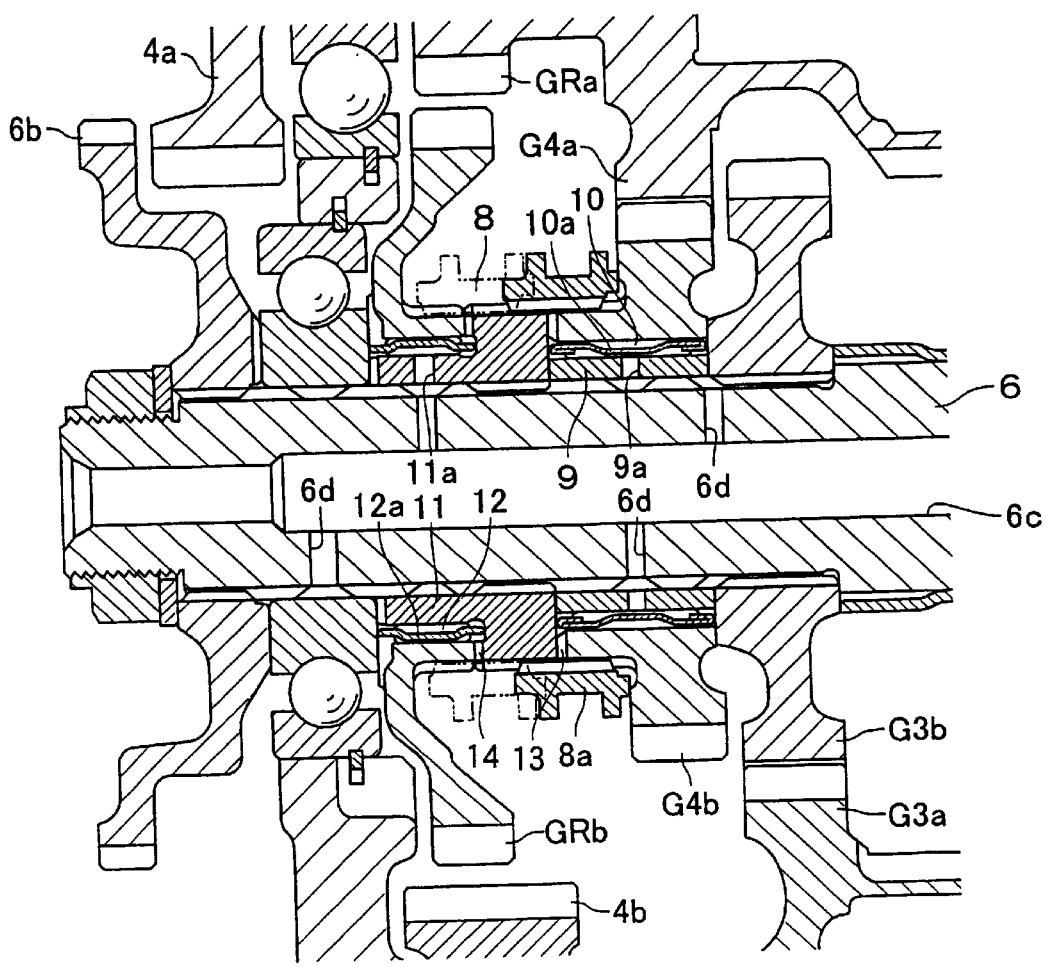
FIG. 3 is an enlarged cross-sectional view of a main part of the automatic transmission shown in FIG. 1.

Here, the third speed driven gear G3b is disposed contiguously with the fourth speed driven gear G4b. In addition, as clearly shown in FIG. 3, a spacer collar 9 is provided on the output shaft 6 so as to be positioned between the selector hub 8a and the third speed driven gear G3b, and the fourth speed drive gear G4a is rotatably supported on the spacer collar 9 via a needle bearing 10. In addition, a spacer collar 11 extending axially outwardly is integrally formed on the selector hub 8a, and the reverse driven gear GRb is rotatably supported on the spacer collar 11 via a needle bearing 12. Note that the spacer collar 9 can be integrally formed on the selector hub 8a in addition to the spacer collar 11. In FIG. 3, reference numerals 10a, 12a denote retainers for the needle bearings 10, 12, respectively.

Lubricating oil is supplied to the needle bearings 10, 12, respectively, from an axial hole 6c in the output shaft 6 via respective oil holes 6d formed in the output shaft 6 and oil holes 9a, 11a formed in the spacer collars 9,11, respectively. In addition, this lubricating oil so supplied is also supplied to the selector 8 via oil grooves 13, 14 formed in the slide contact surfaces of the fourth speed and reverse driven gears G4b, GRb and the selector hub 8a.

In case that the third speed driven gear G3b is disposed contiguously with the fourth speed driven gear G4b, as is described above, the fourth speed driven gear G4b rotates in the normal direction by receiving power transmission from the fourth speed hydraulic clutch C4 relative to the third speed driven gear C3b which rotates in the reverse direction together with the output shaft 6 when the reverse gear GR is obtained, thereby generating a possibility that there is caused friction between both the driven gears G3b, G4b. Here, since the drive gears G1a to G5a, GRa for the respective gears and the driven gears G1b to G5b, GRb are structured by helical gears, in the event that the orientation of helical teeth formed in the third speed driven gear G3b is set so as to generate a thrust force in a direction in which the third speed driven gear G3b is separated apart from the fourth speed driven gear G4b when the third speed driven gear G3b rotates in the normal direction, the third speed driven gear G3b rotates in the reverse direction in a state in which the third speed driven gear G3b bears a load by the inertia of the third speed drive gear G3a when the reverse gear GR is obtained, whereby the thrust force directed toward the fourth speed driven gear G4b side is exerted on the third speed driven gear G3b when the reverse gear GR is obtained. According to the invention, however, since the thrust force is received by the spacer collar 9, there is no risk of the third speed driven gear G3b being pressed against the fourth speed driven gear G4b by virtue of the thrust force.

In addition, in this embodiment, the orientation of helical teeth formed in the fourth speed driven gear G4b is set so as to generate a thrust force in a direction in which the fourth speed driven gear G4b approaches the selector hub 8a when the fourth speed driven gear G4b rotates in the normal direction. Therefore, there is no risk of the fourth speed driven gear G4b being pressed against the third speed driven gear G3b by virtue of the thrust force so exerted on the fourth speed driven gear G4b when the reverse gear is obtained. Consequently, there is generated no friction loss due to friction generated between the third speed driven gear G3b and the fourth speed driven gear G4b when the reverse gear GR is obtained. On the other hand, there is caused a friction between the fourth speed driven gear G4b and the selector hub 8a, but since the slide contact surfaces of the fourth speed driven gear G4b and the selector hub 8a are sufficiently lubricated with lubricating oil flowing through the oil grooves 13, the friction loss attributed to friction can be suppressed to a lower level. Moreover, since the possibility is extremely low that the reverse gear GR is obtained, there is caused almost no probability that the fuel economy is deteriorated by the friction loss.

In addition, since the press contact between the third speed driven gear G3c and the fourth speed driven gear G4c is prevented, even if no oil groove is formed in the third speed driven gear G3c for lubrication relative to the fourth speed driven gear G4c, sufficient lubrication is obtained only by supplying lubricating oil between the third speed driven gear G3b and the fourth speed driven gear G4b via the oil holes 6d formed in the output shaft 6.

Further, in the event that lubrication oil grooves are formed in the third speed driven gear G3b, the effective length of a connecting portion (a spline portion) of the third speed driven gear portion G3b relative to the output shaft 6 is reduced by the depth of the lubrication oil grooves, and consequently, with a view to securing an effective length required for maintaining the predetermined strength required for the third speed driven gear R3c, the overall length of the connecting portion has to be increased, this calling an increase in the axial length of the automatic transmission. However, according to the invention, since there is no need to form lubrication oil grooves in the third speed driven gear G3b, the aforesaid drawback will not be generated. Incidentally, although FIGS. 1 to 3 simply shows the teeth of the drive gears G1a to G5a, GRa and the driven gears G1b to G5b, GRb, these teeth shown in FIGS. 1 to 3 indicate the helical teeth of each helical gear.

Additionally, in the embodiment, while the forward first gear which shares the hydraulic clutch with the reverse gear GR is illustrated as the 4th speed G4 and the driven gear G3b for the third speed G3, which is the second gear, is disposed contiguous with the driven gear G3b for the 4th speed G4, the invention is not limited to this construction. For example, the first gear may be made to be a 5th speed and the second gear may be made to be a Second speed, and a second speed driven gear may be disposed contiguous with a fifth speed driven gear.

As is clear from what has been described heretofore, according to the invention, the axial length of the transmission can be reduced and the fuel economy can be improved while reducing friction loss.

What is claimed is:

1. A three parallel shaft automatic transmission comprising:
 a first input shaft;
 a second input shaft adapted to rotate in synchronism with said first input shaft;
 an output shaft, said first and second input shaft and said output shaft being disposed in parallel with one another;
 a first hydraulic clutch provided on said first input shaft for obtaining a forward first gear;
 a drive gear for said first gear connected to said first input shaft via said first hydraulic clutch;

a reverse drive gear integrally connected to said first gear drive gear, said first gear drive gear and said reverse gear being rotatably supported on said first input shaft;

a second hydraulic clutch provided on said second input shaft for obtaining a forward second gear;

a drive gear for said second gear rotatably supported on said second input shaft to be connected to said second input shaft via said second hydraulic clutch;

a driven gear for said first gear rotatably supported on said output shaft for mesh engagement with said first gear drive gear;

a reverse driven gear rotatably supported on said output shaft for mesh engagement with said reverse drive gear via an idle gear, a driven gear for said second gear connected to said output shaft for mesh engagement with said second gear drive gear;

a selector hub connected to said output shaft while positioning said first gear driven gear and said reverse driven gear on axial ends thereof, said first gear driven gear and reverse driven gear being made free to be selectively connected to said selector hub via a forward and reverse switching selector, wherein said second gear driven gear is disposed contiguously with said first gear driven gear, a spacer collar is disposed on said output shaft so as to be positioned between said selector hub and said second gear driven gear, and said first gear driven gear is rotatably supported on said spacer collar.

2. The three parallel shaft automatic transmission as set forth in claim 1, wherein the orientation of helical teeth formed in said first gear driven gear is set so as to generate a thrust force in a direction in which said first gear driven gear approaches said selector hub when said first gear driven gear rotates in a normal direction which is a forward rotating direction of said first gear driven gear.

3. The three parallel shaft automatic transmission as set forth in claim 1, further comprising:

a needle bearing disposed between said spacer collar and said first gear driven gear in the radial direction of said output shaft, wherein said spacer collar defines an oil holes for supplying the lubricating oil to said needle bearing.

4. The three parallel shaft automatic transmission as set forth in claim 1, further comprising:

another spacer collar disposed between said output shaft and said reverse driven gear, said another spacer collar defining a sliding surface on the outer periphery thereof for sliding said selector hub.

5. A three parallel shaft automatic transmission comprising a first input shaft, a second input shaft adapted to rotate in synchronism with said first input shaft and an output shaft which are disposed in parallel with one another, wherein a first hydraulic clutch for obtaining a forward first gear and a second hydraulic clutch for obtaining a forward second gear are separately provided on said first input shaft and said second input shaft, respectively, wherein a drive gear for said first gear connected to said first input shaft via said first hydraulic clutch and a reverse drive gear integrally connected to said first gear drive gear are rotatably supported on said first input shaft, wherein a driven gear for said first gear for mesh engagement with said first gear drive gear and a reverse driven gear adapted to mesh with said reverse drive gear via an idle gear are positioned on axial ends of a selector hub connected to said output shaft to be rotatably supported on said output shaft, both said first gear driven gear and reverse driven gear being made free to be selectively connected to said selector hub via a forward and reverse switching selector, wherein a drive gear for said second gear connected to said second input shaft via said second hydraulic clutch is rotatably supported on said second input shaft, whereas a driven gear for said second gear adapted to mesh with said second gear drive gear is connected to said output shaft, and wherein said second gear driven gear is disposed contiguously with said first gear driven gear, a spacer collar is disposed on said output shaft so as to be positioned between said selector hub and said second gear driven gear, and said first gear driven gear is rotatably supported on said spacer collar.

* * * * *